United States Patent
Satish

(10) Patent No.: US 9,805,115 B1
(45) Date of Patent: Oct. 31, 2017

(54) SYSTEMS AND METHODS FOR UPDATING GENERIC FILE-CLASSIFICATION DEFINITIONS

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 234 days.

(21) Appl. No.: 14/210,364

(22) Filed: Mar. 13, 2014

(51) Int. Cl.
*G06F 17/30* (2006.01)

(52) U.S. Cl.
CPC .............................. *G06F 17/30705* (2013.01)

(58) Field of Classification Search
CPC ....................................................... G06F 17/30
See application file for complete search history.

(56) References Cited

U.S. PATENT DOCUMENTS

| | | | |
|---|---|---|---|
| 5,796,924 | A | 8/1998 | Errico et al. |
| 7,634,661 | B2 | 12/2009 | England et al. |
| 8,527,978 | B1 | 9/2013 | Sallam |
| 8,561,193 | B1 | 10/2013 | Srivastava et al. |
| 8,627,469 | B1 | 1/2014 | Chen et al. |
| 8,655,883 | B1 * | 2/2014 | Yuksel .................. G06Q 30/02 707/735 |
| 2002/0099702 | A1 | 7/2002 | Oddo |
| 2004/0249774 | A1 | 12/2004 | Caid et al. |
| 2007/0136455 | A1 * | 6/2007 | Lee ........................ G06F 21/564 709/223 |
| 2007/0185901 | A1 | 8/2007 | Gates |
| 2010/0083376 | A1 | 4/2010 | Pereira et al. |
| 2011/0107424 | A1 * | 5/2011 | Singh ................ G06F 17/30109 726/24 |
| 2011/0271341 | A1 | 11/2011 | Satish et al. |
| 2012/0054184 | A1 * | 3/2012 | Masud .............. G06F 17/30598 707/737 |
| 2013/0276114 | A1 * | 10/2013 | Friedrichs ............... G06F 21/56 726/23 |

(Continued)

OTHER PUBLICATIONS

Sourabh Satish; Systems and Methods for Clustering Data Samples; U.S. Appl. No. 13/780,765, filed Feb. 28, 2013.

(Continued)

*Primary Examiner* — Augustine K Obisesan
*Assistant Examiner* — Lahcen Ennaji
(74) *Attorney, Agent, or Firm* — FisherBroyles, LLP

(57) ABSTRACT

A computer-implemented method for updating generic file-classification definitions may include (1) identifying at least one generic file-classification definition deployed in a software product installed on a client device, (2) classifying at least one data sample encountered by the client device based at least in part on the generic file-classification definition, (3) querying at least one verification server in an attempt to verify the correctness of the classification of the data sample, (4) determining that the classification of the data sample is incorrect based at least in part on the query, and then (5) modifying the generic file-classification definition deployed in the software product based at least in part on the data sample. Various other methods, systems, and computer-readable media are also disclosed.

14 Claims, 6 Drawing Sheets

(56) References Cited

U.S. PATENT DOCUMENTS

2014/0201208 A1   7/2014  Satish et al.
2014/0207518 A1*  7/2014  Kannan ............ G06Q 30/0201
                                                    705/7.29

OTHER PUBLICATIONS

Wikipedia, "Cluster Analysis", http://en.wikipedia.org/wiki/Data_clustering#Comparison_between_data_clusterings, as accessed on Nov. 29, 2012.
Khorshidpour, Zeinab et al., "An Evolvable-Clustering-Based Algorithm to Learn Distance Function for Supervised Environment", IJCSI International Journal of Computer Science Issues, vol. 7, Issue 5, (Sep. 2010), pp. 374-381.
Sourabh Satish; Systems and Methods for Predicting Optimum Run Times for Software Samples; U.S. Appl. No. 13/794,720, filed Mar. 11, 2013.
Hu, Xin et al., "MutantX-S: Scalable Malware Clustering Based on Static Features", http://0b4af6cdc2f0c5998459-c0245c5c937c5dedcca3f1764ecc9b2f.r43.cf2.rackcdn.com/11753-atc13-hu.pdf, as accessed Jan. 14, 2014, 2013 USENIX Annual Technical Conference (USENIX ATC '13), USENIX Association, (2013), pp. 187-198.
Joseph H. Chen; Systems and Methods for Preventing Positive Malware Identification; U.S. Appl. No. 14/197,877, filed Mar. 5, 2014.
Sourabh Satish, et al.; Systems and Methods for Clustering Data; U.S. Appl. No. 14/214,581, filed Mar. 14, 2014.
Gonzalez, Teofilo F., "Clustering to Minimize the Maximum Intercluster Distance", https://www.cs.ucsb.edu/~teo/papers/Ktmm.pdf, as accessed Jan. 14, 2014, Theoretical Computer Science 38, North-Holland, Elsevier Science Publishers B.V., (1985), pp. 293-306.
Satish, Sourabh, "Behavioral Security: 10 steps forward 5 steps backward", DeepSec IDSC 2011, Vienna, Austria, (Nov. 15-18, 2011).
You, Chao et al., "An Approach to Detect Malicious Behaviors by Evading Stalling Code", Telkomnika, vol. 10, No. 7, (Nov. 2012), pp. 1766-1770.
Barbará, Daniel, "Requirements for Clustering Data Streams", http://www.cs.iastate.edu/~honavar/datastreamcluster.pdf, as accessed Jan. 14, 2014, SIGKDD Explorations, vol. 3, Issue 2, (Jan. 2002), 23-27.
Nguyen, Hai-Long et al., "Concurrent Semi-supervised Learning of Data Streams", http://link.springer.com/chapter/10.1007%2F978-3-642-23544-3_34, as accessed Jan. 14, 2014, Data Warehousing and Knowledge Discovery, 13th International Conference, DaWaK 2011, Lecture Notes in Computer Science vol. 6862, Springer Berlin Heidelberg, Toulouse, France, (Aug. 29-Sep. 2, 2011), 445-459.
Valko, Michal et al., "Online Semi-Supervised Learning on Quantized Graphs", http://arxiv.org/ftp/arxiv/papers/1203/1203.3522.pdf, as accessed Jan. 14, 2014, Proceedings of the Twenty-Sixth Conference on Uncertainty in Artificial Intelligence (UAI2010), AUAI Press, Catalina Island, CA, (Jul. 8-11, 2010).
Goldberg, Andrew B., "OASIS: Online Active Semi-Supervised Learning", http://pages.cs.wisc.edu/~jerryzhu/pub/oasis.pdf, as accessed Jan. 14, 2014, Association for the Advancement of Artificial Intelligence, (2011).
Kholghi, Mahnoosh et al., "Active Learning Framework Combining Semi-Supervised Approach for Data Stream Mining", http://link.springer.com/chapter/10.1007%2F978-3-642-18134-4_38, as accessed Jan. 14, 2014, Intelligent Computing and Information Science, International Conference, ICICIS 2011, Proceedings, Part II, Communications in Computer and Information Science vol. 135, Springer Berlin Heidelberg, Chongqing, China, (Jan. 8-9, 2011), 238-243.
Sourabh Satish; Systems and Methods for Predicting Optimum Run Times for Software Samples; U.S. Appl. No. 15/192,646, filed Jun. 24, 2016.

* cited by examiner

SYSTEMS AND METHODS FOR UPDATING GENERIC FILE-CLASSIFICATION DEFINITIONS

BACKGROUND

Generic file-classification definitions are often used to classify files based at least in part on the files' features. For example, a security software product may apply a generic file-classification definition to a file encountered by an end user's computing device. In this example, the security software product may compare various features of the file (such as the file's name, size, storage location, source, extension, format, and/or creation date) with the generic file-classification definition. By comparing such features with the generic file-classification definition, the security software product may be able to fairly accurately classify the file as either clean or malicious.

Unfortunately, such generic file-classification definitions may still lead to false positives and/or false negatives in certain scenarios. For example, a security software vendor may generate the generic file-classification definition from a set of training data that includes known clean and/or malicious files. However, after generating the generic file-classification definition and releasing the same to the security software product, the security software vendor may identify new clean and/or malicious files. Since the set of training data did not include these newly identified files, the generic file-classification definition may fail to account for certain information derived from these newly identified files. As a result, the generic file-classification definition may cause the security software product to produce a false negative and/or false positive upon encountering one of these files on the end-user's computing device.

The instant disclosure, therefore, identifies and addresses a need for improved systems and methods for updating generic file-classification definitions to account for newly identified clean and/or malicious files.

SUMMARY

As will be described in greater detail below, the instant disclosure describes various systems and methods for updating generic file-classification definitions to account for newly identified clean and/or malicious files.

In one example, a computer-implemented method for updating generic file-classification definitions may include (1) identifying at least one generic file-classification definition deployed in a software product installed on a client device, (2) classifying at least one data sample encountered by the client device based at least in part on the generic file-classification definition, (3) querying at least one verification server in an attempt to verify the correctness of the classification of the data sample, (4) determining that the classification of the data sample is incorrect based at least in part on the query, and then (5) modifying the generic file-classification definition deployed in the software product based at least in part on the data sample.

In one example, the method may also include identifying at least one data cluster that includes a plurality of training data samples, a centroid, and/or a distance threshold. In this example, the method may further include computing a distance from the centroid of the data cluster to the data sample. Additionally or alternatively, the method may include classifying the data sample based at least in part on the distance from the centroid to the data sample.

In one example, the method may also include applying a distance function that generates a value representing the distance from the centroid to data sample. In this example, the method may further include determining that the value representing the distance from the centroid to the data sample is below the distance threshold by comparing the value with the distance threshold. Additionally or alternatively, the method may include determining that the value representing the distance from the centroid to the data sample is above the distance threshold by comparing the value with the distance threshold.

In one example, the method may also include determining that the distance from the centroid to the data sample is above the distance threshold. In this example, the method may further include increasing the distance threshold such that the distance from the centroid to the data sample is below the distance threshold.

In one embodiment, the distance threshold may represent a distance above which data samples are unlikely to include malware. In this embodiment, the method may also include classifying the data sample as non-malware due at least in part to the distance from the centroid to the data sample being above the distance threshold. Additionally or alternatively, the method may include increasing the distance threshold beyond the data sample such that the generic file-classification definition classifies the data sample as malware.

In one example, the method may also include determining that the distance from the centroid to the data sample is below the distance threshold. In this example, the method may further include decreasing the distance threshold such that the distance from the centroid to the data sample is above the distance threshold.

In one embodiment, the distance threshold may represent a distance below which data samples are likely to include malware. In this embodiment, the method may also include classifying the data sample as malware due at least in part to the distance from the centroid to the data sample being below the distance threshold. Additionally or alternatively, the method may include decreasing the distance threshold within the data sample such that the generic file-classification definition classifies the data sample as non-malware.

In one embodiment, the centroid may include a reference data point calculated based at least in part on the plurality of training data samples. Similarly, the distance threshold may include a reference distance determined based at least in part on the plurality of training data samples.

In one example, the method may also include classifying a plurality of data samples encountered by the client device based at least in part on the generic file-classification definition. In this example, the method may further include customizing the generic file-classification definition to the client device based at least in part on the plurality of data samples encountered by the client device.

In one example, the method may also include obtaining information about the data sample that was unavailable when the generic file-classification definition was released. In this example, the method may further include determining that the classification of the data sample is incorrect based at least in part on the information about the data sample.

In one example, a system for implementing the above-described method may include (1) an identification module that identifies at least one generic file-classification definition deployed in a software product installed on a client device, (2) a classification module that classifies at least one data sample encountered by the client device based at least in part on the generic file-classification definition, (3) a query module that queries at least one verification server in an attempt to verify the correctness of the classification of the data sample, (4) a determination module that determines that the classification of the data sample is incorrect based at least in part on the query, and (5) a modification module that modifies the generic file-classification definition deployed in the software product based at least in part on the data sample. The system may also include at least one processor configured to execute the identification module, the classification module, the query module, the determination module, and the modification module.

In one example, the above-described method may be encoded as computer-readable instructions on a computer-readable-storage medium. For example, a computer-readable-storage medium may include one or more computer-readable instructions that, when executed by at least one processor of a computing device, may cause the computing device to (1) identify at least one generic file-classification definition deployed in a software product installed on a client device, (2) classify at least one data sample encountered by the client device based at least in part on the generic file-classification definition, (3) query at least one verification server in an attempt to verify the correctness of the classification of the data sample, (4) determine that the classification of the data sample is incorrect based at least in part on the query, and then (5) modify the generic file-classification definition deployed in the software product based at least in part on the data sample.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
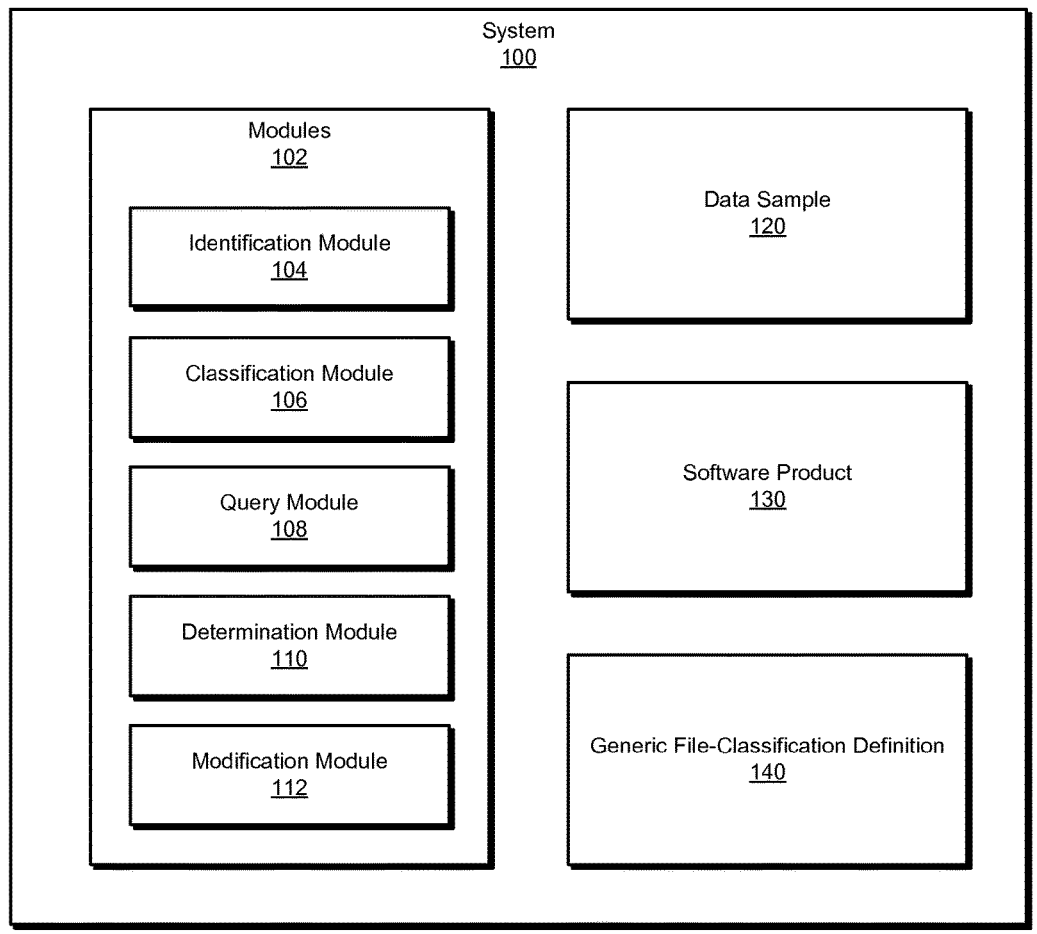
FIG. 1 is a block diagram of an exemplary system for updating generic file-classification definitions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for updating generic file-classification definitions. As will be explained in greater detail below, upon classifying a data sample based at least in part on a generic file-classification definition, the various systems and methods described herein may query at least one verification server in an attempt to verify the correctness of the classification of the data sample. By querying the verification server, the various systems and methods described herein may determine that the classification of the data sample is incorrect. In response to this determination, the various systems and methods described herein may modify the generic file-classification definition to account for the incorrect classification of the data sample.

Moreover, by modifying the generic file-classification definition at a client device that encountered the data sample, the various systems and methods described herein may conserve time and/or resources by eliminating the need to fully retrain the generic file-classification definition. Additionally or alternatively, by modifying the generic file-classification definition at the client device that encountered the data sample, the various systems and methods described herein may customize the generic file-classification definition to the client device based at least in part on the browsing behavior and/or patterns of the user of the client device.

Figure 2:
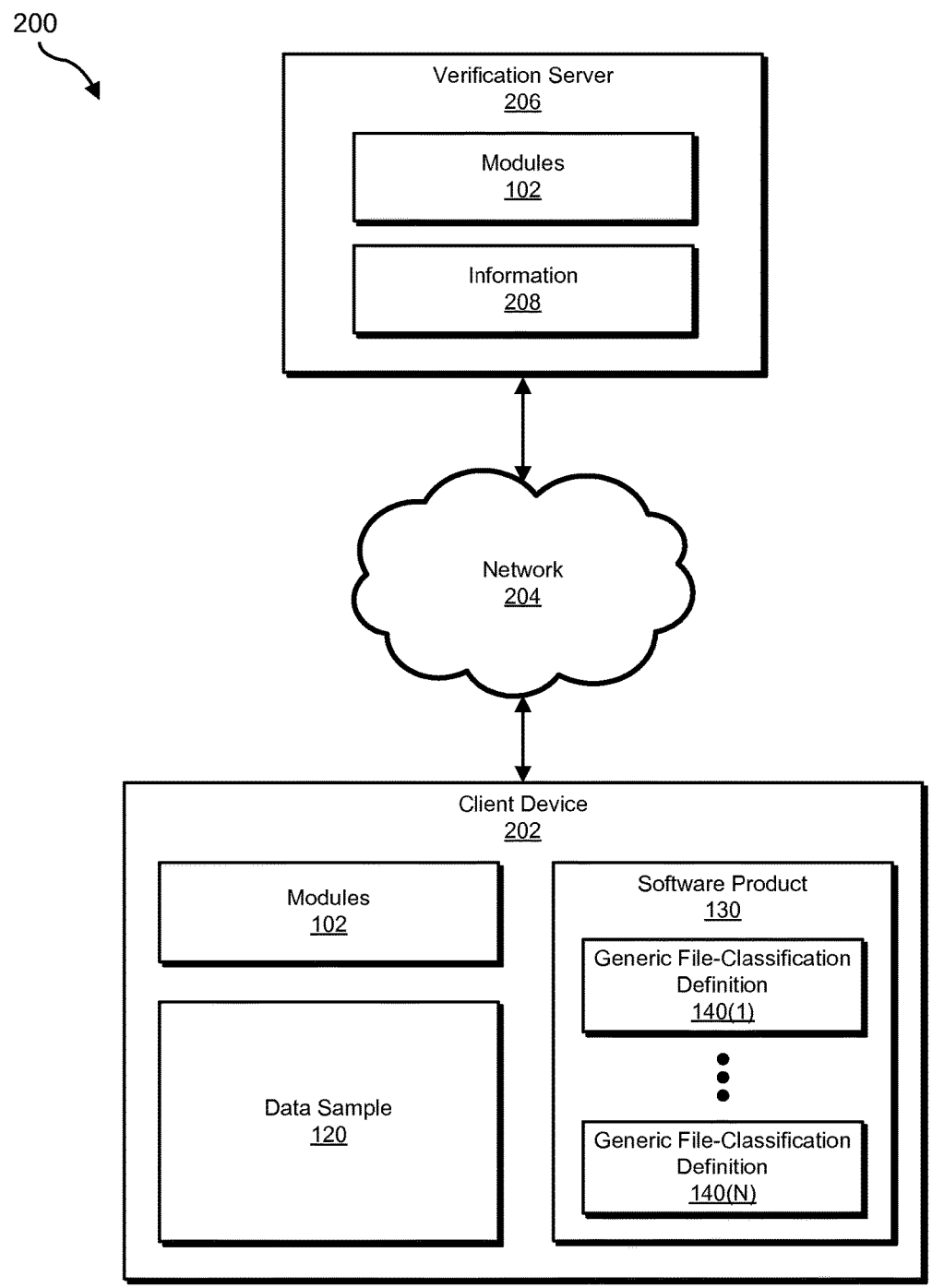
FIG. 2 is a block diagram of an additional exemplary system for updating generic file-classification definitions.

The following will provide, with reference to FIGS. 1-2, detailed descriptions of exemplary systems for updating generic file-classification definitions. Detailed descriptions of corresponding computer-implemented methods will also be provided in connection with FIG. 3. Detailed descriptions of an exemplary data cluster will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for updating generic file-classification definitions. As illustrated in this figure, exemplary system 100 may include one or more modules 102 for performing one or more tasks. For example, and as will be explained in greater detail below, exemplary system 100 may include an identification module 104 that identifies at least one generic file-classification definition deployed in a software product installed on a client device. Exemplary system 100 may also include a classification module 106 that classifies at least one data sample encountered by the client device based at least in part on the generic file-classification definition 140.

In addition, and as will be described in greater detail below, exemplary system 100 may include a query module 108 that queries at least one verification server in an attempt to verify the correctness of the classification of the data sample. Exemplary system 100 may also include a determination module 110 that determines that the classification of the data sample is incorrect based at least in part on the query. Exemplary system 100 may further include a modification module 112 that modifies the generic file-classification definition deployed in the software product based at least in part on the data sample. Although illustrated as separate elements, one or more of modules 102 in FIG. 1 may represent portions of a single module or application (such as SYMANTEC'S NORTON ANTIVIRUS, SYMANTEC'S NETWORK SECURITY, SYMANTEC'S NORTON INTERNET SECURITY, MCAFEE ALL ACCESS, MCAFEE TOTAL PROTECTION, MCAFEE INTERNET SECURITY, F-SECURE ANTI-VIRUS, TITANIUM ANTI-VIRUS+SECURITY, and/or KASPERSKY ANTI-VIRUS).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client device 202 and/or verification server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more data samples, such as data sample 120. The phrase "data sample," as used herein, generally refers to any type or form of computer data, metadata, features, characteristics, attributes, behaviors, and/or information related to a file. In one embodiment, data sample 120 may represent a portion of data included in a file. Additionally or alternatively, data sample 120 may represent the entire file (including all of the data, metadata, and/or information related to the file). Examples of data sample 120 include, without limitation, executable files, document files, data files, batch files, archive files, media files, backup files, library files, compressed files, scripts, binary code, machine code, portions of one or more of the same, combinations of one or more of the same, or any other suitable data sample.

Examples of features, characteristics, and/or attributes of data sample 120 include, without limitation, the name of data sample 120, the size of data sample 120, the storage location of data sample 120, the source computing device that hosts data sample 120, the file extension of data sample 120, the file format of data sample 120, the creation date and/or time of data sample 120, the number of functions imported by data sample 120, static features of data sample 120, dynamic features of data sample 120, run-time behaviors of data sample 120, whether data sample 120 generates visible windows for display, whether data sample 120 generates network traffic, combinations of one or more of the same, or any other suitable metadata.

As illustrated in FIG. 1, exemplary system 100 may also include one or more software products, such as software product 130. The phrase "software product," as used herein, generally refers to any type or form of computer software and/or application. In one embodiment, software product 130 may include one or more generic file-classification definitions used to classify data samples. Examples of software product 130 include, without limitation, security software products, classification software products, client-side agents, SYMANTEC'S NORTON ANTIVIRUS, SYMANTEC'S NETWORK SECURITY, SYMANTEC'S NORTON INTERNET SECURITY, MCAFEE ALL ACCESS, MCAFEE TOTAL PROTECTION, MCAFEE INTERNET SECURITY, F-SECURE ANTI-VIRUS, TITANIUM ANTI-VIRUS+SECURITY, and/or KASPERSKY ANTI-VIRUS, portions of one or more of the same, combinations of one or more of the same, or any other suitable software product.

As illustrated in FIG. 1, exemplary system 100 may also include one or more generic file-classification definitions, such as generic file-classification definition 140. The phrase "generic file-classification definition," as used herein, generally refers to any type or form of tool and/or model capable of classifying data samples. In one embodiment, generic file-classification definition 140 may include a plurality of features used to classify data samples. Additionally or alternatively, generic file-classification definition 140 may facilitate classifying data samples by comparing the plurality of features with the data samples. Examples of generic file-classification definition 140 include, without limitation, signatures, heuristics, classifiers, data clusters, perceptrons, decision trees, combinations of one or of the same, or any other suitable generic file-classification definition.

Examples of features used to classify data samples include, without limitation, the name of data sample, the size of the data sample, the storage location of the data sample, the source computing device that hosts the data sample, the file extension of the data sample, the file format of the data sample, the creation date and/or time of the data sample, the number of functions imported by the data sample, static features of the data sample, dynamic features of the data sample, run-time behaviors of the data sample, whether the data sample generates visible windows for display, whether the data sample generates network traffic, combinations of one or more of the same, or any other suitable features of data samples.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client device 202 in communication with a verification server 206 via a network 204.

In one embodiment, client device 202 may be programmed with one or more of modules 102. Although illustrated as external modules, modules 102 may represent portions of software product 130. In this embodiment, client device 202 may include data sample 120 and/or software product 130. Additionally or alternatively, software product 130 may include one or more of generic file-classification definitions 140(1)-(N).

In one embodiment, verification server 206 may be programmed with one or more of modules 102. Additionally or alternatively, verification server 206 may include information 208 about data sample 120. As will be described in greater detail below, information 208 may indicate that data sample 120 is either clean or malicious.

In one embodiment, one or more of modules 102 from FIG. 1 may, when executed by at least one processor of client device 202 and/or verification server 206, enable client device 202 and/or verification server 206 to update generic file-classification definitions. For example, and as will be described in greater detail below, one or more of modules 102 may cause client device 202 and/or verification server 206 to (1) identify generic file-classification definition 140(1) deployed in software product 130 installed on client device 202, (2) classify data sample 120 encountered by client device 202 based at least in part on generic file-classification definition 140(1), (3) query verification server 206 in an attempt to verify the correctness of the classification of data sample 120, (4) determine that the classification of data sample 120 is incorrect based at least in part on the query, and then (5) modify generic file-classification definition 140(1) deployed in software product 130 based at least in part on data sample 120.

Client device 202 generally represents any type or form of computing device capable of reading computer-executable instructions. Examples of client device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Verification Server 206 generally represents any type or form of computing device capable of verifying and/or contradicting classifications of data samples. Examples of verification server 206 include, without limitation, security servers, application servers, web servers, storage servers, and/or database servers configured to run certain software applications and/or provide various security, web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between client device 202 and verification server 206.

Figure 3:
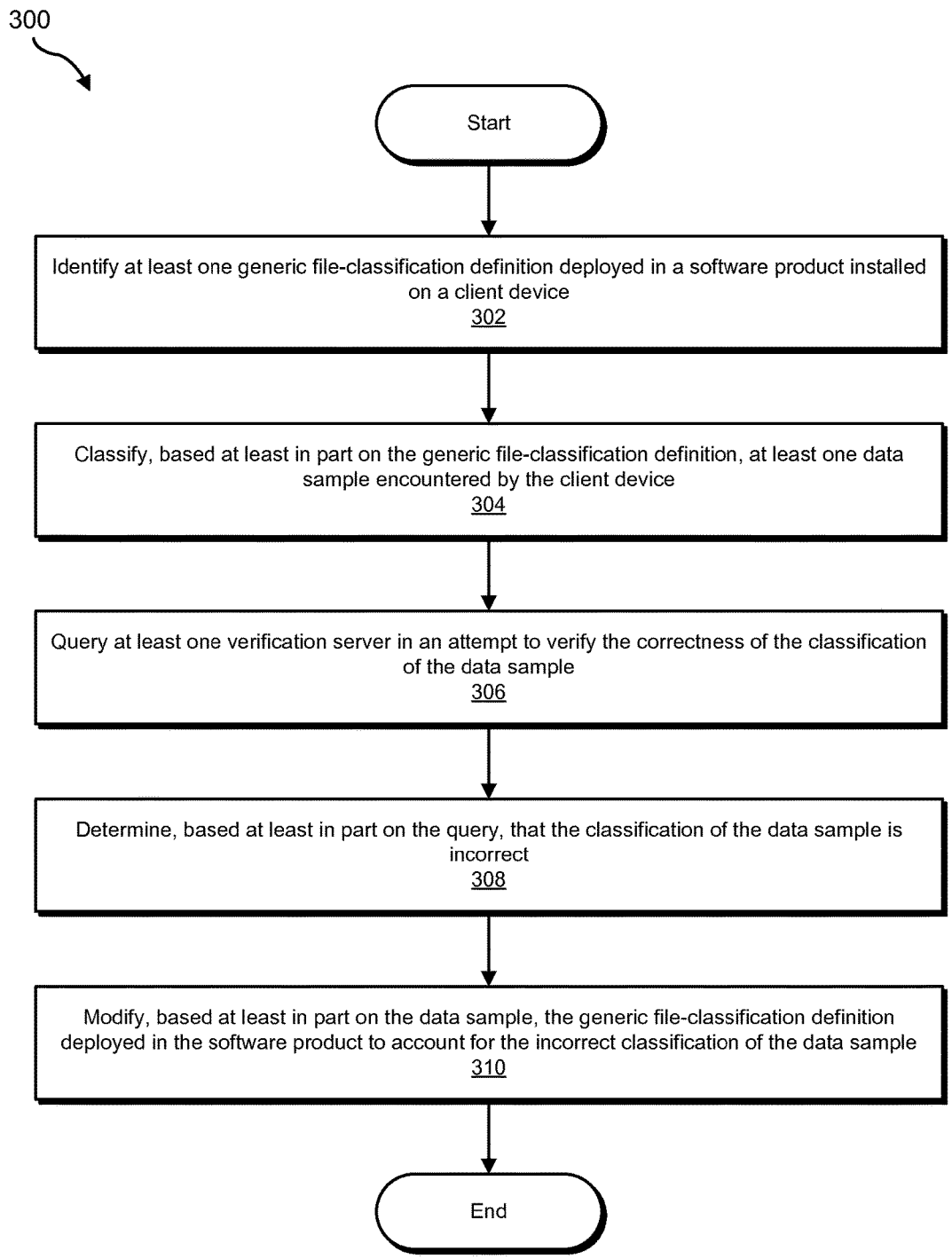
FIG. 3 is a flow diagram of an exemplary method for updating generic file-classification definitions.

FIG. 3 is a flow diagram of an exemplary computer-implemented method 300 for updating generic file-classification definitions. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify at least one generic file-classification definition deployed in a software product installed on a client device. For example, identification module 104 may, as part of client device 202 and/or verification server 206 in FIG. 2, identify generic file-classification definition 140(1) deployed in software product 130 installed on client device 202. In this example, generic file-classification definition 140(1) may include a plurality of features used to classify data samples encountered by client device 202. Additionally or alternatively, generic file-classification definition 140(1) may facilitate classifying data samples by comparing the plurality of features with the data samples encountered by client device 202.

The systems described herein may perform step 302 in a variety of ways. In some examples, identification module 104 may identify generic file-classification definition 140(1) upon deployment of generic file-classification definition 140(1). For example, a security server (not illustrated in FIG. 2) may generate generic file-classification definition 140(1) for deployment in software product 130. The security server may then release generic file-classification definition 140(1) by distributing and/or pushing generic file-classification definition 140(1) to client device 202 via network 204.

Upon receiving generic file-classification definition 140(1) from the security server, client device 202 may incorporate generic file-classification definition 140(1) into software product 130. As client device 202 incorporates generic file-classification definition 140(1) into software product 130, identification module 104 may identify generic file-classification definition 140(1).

In some examples, identification module 104 may identify generic file-classification definition 140(1) upon installation of software product 130. For example, a user may install software product 130 on client device 202. In this example, software product 130 may come with generic file-classification definition 140(1). During the installation of software product 130, identification module 104 may identify generic file-classification definition 140(1) as a native component of software product 130.

Figure 4:
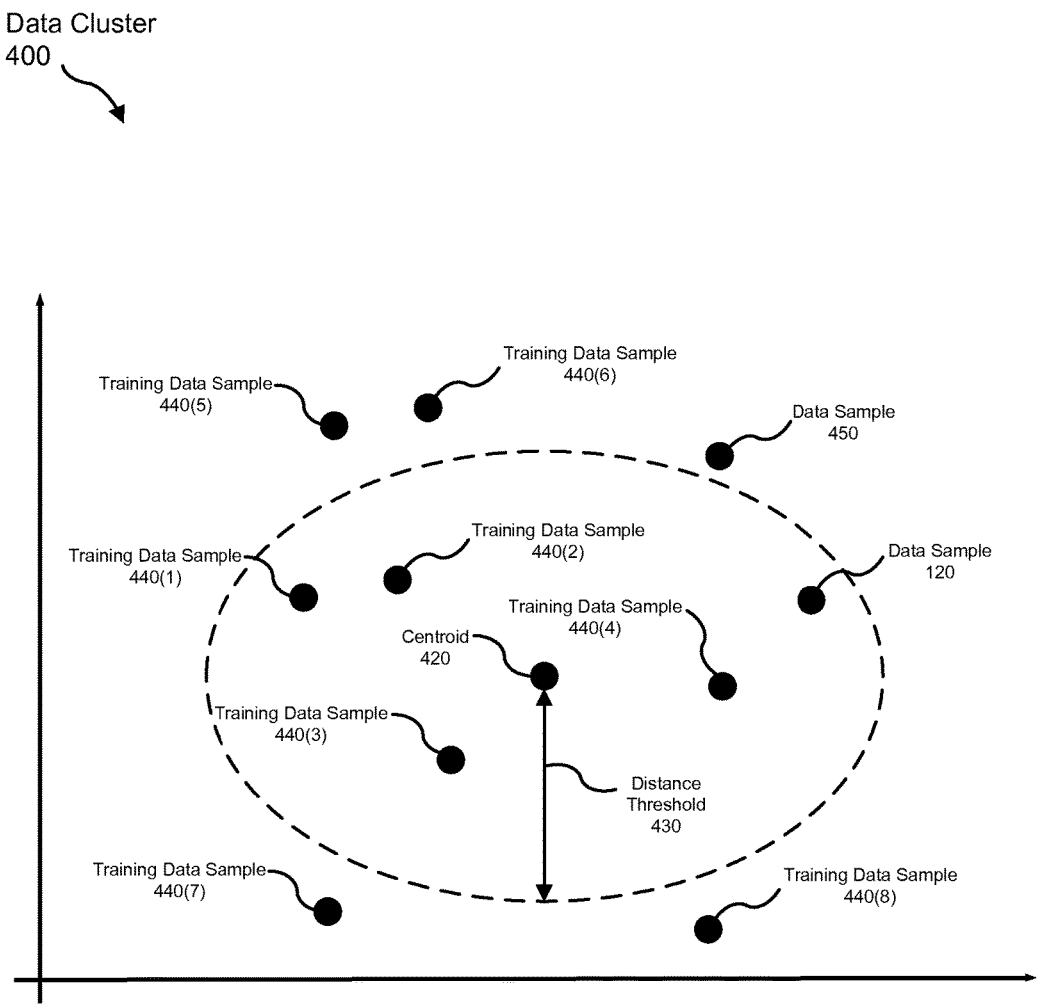
FIG. 4 is an illustration of an exemplary data cluster.

In some examples, identification module 104 may identify certain features of generic file-classification definition 140(1). For example, identification module 104 may identify a data cluster 400 in FIG. 4 in connection with generic file-classification definition 140(1). As illustrated in FIG. 4, data cluster 400 may include a centroid 420, a distance threshold 430, and/or training data samples 440(1)-(8).

The term "centroid," as used herein, generally refers to any type or form of reference data point within a data cluster. The term "distance threshold," as used herein, generally refers to any type or form of value, measurement, and/or metric that represents a certain distance from a centroid of a data cluster. In one embodiment, distance threshold 430 may vary throughout data cluster 400. As illustrated in FIG. 4, distance threshold 430 may create a non-uniform (e.g., oval-shaped) virtual perimeter, as opposed to a uniform (e.g., circular) virtual perimeter, around centroid 420.

The phrase "training data sample," as used herein, generally refers to any type or form of computer data, metadata, and/or information related to a known file. In one embodiment, training data samples 440(1)-(4) may represent a set of known clean and/or non-malicious files. Additionally or alternatively, training data samples 440(5)-(8) may represent a set of known malicious files.

In some examples, the security server may train generic file-classification definition 140(1) based at least in part on training data samples 440(1)-(8). Examples of training data samples 440(1)-(8) include, without limitation, executable files, document files, data files, batch files, archive files, media files, backup files, library files, compressed files, scripts, binary code, machine code, portions of one or more of the same, combinations of one or more of the same, or any other suitable training data samples.

As part of training generic file-classification definition 140(1), the security server may apply at least one statistical algorithm to fit generic file-classification definition 140(1) to training data samples 440(1)-(8). Examples of such a statistical algorithm include, without limitation, Lloyd's algorithm, Voronoi interaction, linear regression, the perceptron algorithm, neural networking, regression trees, combinations of one or more of the same, or any other suitable statistical algorithms.

In one example, the security server may calculate centroid 420 based at least in part on the statistical algorithm. For example, the security server may apply the statistical algorithm to training data samples 440(1)-(8). Upon applying the statistical algorithm, the security server may calculate a value that represents the approximate center of training data samples 440(1)-(8). The security server may then assign this value that represents the approximate center of training data samples 440(1)-(8) to centroid 420.

Additionally or alternatively, the security server may determine distance threshold 430 based at least in part on the statistical algorithm. For example, the security server may apply the statistical algorithm to training data samples 440(1)-(8). Upon applying the statistical algorithm, the security server may calculate a value that represents an approximate distance from centroid 420 that includes training all of data samples 440(1)-(4) but excludes all of training data samples 440(5)-(8). The security server may then assign this value that represents the approximate distance from centroid 420 to distance threshold 430.

Returning to FIG. 3, at step 304 one or more of the systems described herein may classify at least one data sample encountered by the client device based at least in part on the generic file-classification definition. For example, classification module 106 may, as part of client device 202 and/or verification server 206 in FIG. 2, classify data sample 120 encountered by client device 202 based at least in part on generic file-classification definition 140(1). In this example, the classification may identify data sample 120 as malicious. Additionally or alternatively, the classification may identify data sample 120 as clean and/or non-malicious.

The systems described herein may perform step 304 in a variety of ways. In some examples, classification module 106 may classify data sample 120 based at least in part on the distance from centroid 420 of data cluster 400 in FIG. 4 to data sample 120. For example, client device 202 may encounter data sample 120 while the user of client device 202 browses the Internet. As client device 202 encounters data sample 120, classification module 106 may analyze data sample 120 based at least in part on generic file-classification definition 140(1).

As part of analyzing data sample 120, classification module 106 may apply generic file-classification definition 140(1) to data sample 120. For example, classification module 106 may identify certain features, characteristics, and/or attributes of data sample 120. In this example, classification module 106 may compare these features, characteristics, and/or attributes of data sample 120 with generic file-classification definition 140(1). Classification module 106 may then compute the distance from centroid 420 of data cluster 400 in FIG. 4 to data sample 120 based at least in part on this comparison.

Upon computing the distance from centroid 420 to data sample 120, classification module 106 may classify data sample 120 based at least in part on the distance from centroid 420 to data sample 120. For example, classification module 106 may apply a distance function to data sample 120. In this example, the distance function may generate a value that represents the distance from centroid 420 to data sample 120. Classification module 106 may determine that the value representing the distance from centroid 420 to data sample 120 is below distance threshold 430 in FIG. 4 by comparing this value with distance threshold 430. Classification module 106 may then classify data sample 120 based at least in part on this determination.

Additionally or alternatively, classification module 106 may determine that the value representing the distance from centroid 420 to data sample 120 is above distance threshold 430 in FIG. 4 by comparing this value with distance threshold 430. Classification module 106 may then classify data sample 120 based at least in part on this determination.

In one embodiment, distance threshold 430 in FIG. 4 may represent a distance below which data samples are likely to include malware. As illustrated in FIG. 4, data sample 120 may fall inside of the virtual perimeter created by distance threshold 430. In other words, data sample 120 may lie between centroid 420 and distance threshold 430. In this embodiment, classification module 106 may classify data sample 120 as malware due at least in part to the distance from centroid 420 to data sample 120 being below distance threshold 430.

In some examples, classification module 106 may classify at least one additional data samples encountered by client device 202. For example, client device 202 may encounter data sample 450 in FIG. 4 while the user of client device 202 browses the Internet. As client device 202 encounters data sample 450, classification module 106 may analyze data sample 450 based at least in part on generic file-classification definition 140(1).

As part of analyzing data sample 450, classification module 106 may apply generic file-classification definition 140(1) to data sample 450. For example, classification module 106 may identify certain features, characteristics, and/or attributes of data sample 450. In this example, classification module 106 may compare these features, characteristics, and/or attributes of data sample 450 with generic file-classification definition 140(1). Classification module 106 may then compute the distance from centroid 420 of data cluster 400 in FIG. 4 to data sample 120 based at least in part on this comparison. Upon computing the distance from centroid 420 to data sample 450, classification module 106 may classify data sample 450 based at least in part on the distance from centroid 420 to data sample 450.

In one embodiment, distance threshold 430 in FIG. 4 may represent a distance above which data samples are unlikely to include malware. As illustrated in FIG. 4, data sample 450 may fall outside of the virtual perimeter created by distance threshold 430. In other words, data sample 450 may lie beyond distance threshold 430 relative to centroid 420. In this embodiment, classification module 106 may classify data sample 450 as non-malware due at least in part to the distance from centroid 420 to data sample 450 being above distance threshold 430.

Returning to FIG. 3, at step 306 one or more of the systems described herein may query at least one verification server 206 in an attempt to verify the correctness of the classification of the data sample. For example, query module 108 may, as part of client device 202 and/or verification server 206 in FIG. 2, query verification server 206 in an attempt to verify the correctness of the classification of data sample 120. By querying verification server 206, query module 108 may determine whether verification server 206 is aware of any information about data sample 120 that verifies or contradicts the classification.

The systems described herein may perform step 306 in a variety of ways. In some examples, query module 108 may query verification server 206 as to whether the classification of data sample 120 is correct. For example, query module 108 may direct client device 202 to notify verification server 206 that classification module 106 has classified data sample 120 as malware. Query module 108 may also direct client device 202 to query verification server 206 as to whether this classification of data sample 120 as malware is correct.

Additionally or alternatively, query module 108 may direct client device 202 to notify verification server 206 that classification module 106 has classified data sample 450 as non-malware. Query module 108 may also direct client device 202 to query verification server 206 as to whether this classification of data sample 450 as non-malware is correct.

In some examples, query module 108 may request any information about data sample 120 that was unavailable when generic file-classification definition 140(1) was released. For example, query module 108 may direct client device 202 to notify verification server 206 that client device 202 has encountered data sample 120. Additionally or alternatively, query module 108 may direct client device 202 to request any information about data sample 120 that became available after the release of generic file-classification definition 140(1).

Returning to FIG. 3, at step 308 one or more of the systems described herein may determine that the classification of the data sample is incorrect based at least in part on the query. For example, determination module 110 may, as part of client device 202 and/or verification server 206 in FIG. 2, determine that the classification of data sample 120 is incorrect based at least in part on the query.

The systems described herein may perform step 308 in a variety of ways. In some examples, determination module 110 may determine that the classification of data sample 120 is incorrect based at least in part on a response from verification server 206. For example, verification server 206 may provide client device 202 with a response to the query. As client device 202 receives the response from verification server 206, determination module 110 may determine that the response contradicts the classification of data sample 120. Determination module 110 may then determine that the classification of data sample 120 is incorrect based at least in part on this response.

In one embodiment, the response may indicate that data sample 120 is not malware despite the classification of data sample 120 as malware. Additionally or alternatively, the response may indicate that data sample 120 is malware despite the classification of data sample 120 as non-malware.

In some examples, determination module 110 may obtain information 208 about data sample 120 that was unavailable when generic file-classification definition 140(1) was released. For example, verification server 206 may provide client device 202 with information 208 about data sample 120 in response to the request. As client device 202 receives information 208 from verification server 206, determination module 110 may determine that information 208 contradicts the classification of data sample 120. Determination module 110 may then determine that the classification of data sample 120 is incorrect based at least in part on information 208.

Returning to FIG. 3, at step 310 one or more of the systems described herein may modify the generic file-classification definition deployed in the software product to account for the incorrect classification based at least in part on the data sample. For example, modification module 112 may, as part of client device 202 and/or verification server 206 in FIG. 2, modify generic file-classification definition 140(1) deployed in software product 130 based at least in part on data sample 120. In this example, the modification to generic file-classification definition 140(1) may account for and/or address the incorrect classification of data sample 120.

The systems described herein may perform step 310 in a variety of ways. In some examples, modification module 112 may modify generic file-classification definition 140(1) by decreasing distance threshold 430. For example, as described above, classification module 106 may classify data sample 120 as malware due at least in part to the distance from centroid 420 to data sample 120 being below distance threshold 430. In this example, determination module 110 may determine that this classification of data sample 120 as malware is incorrect based at least in part on the query.

In response to this determination, modification module 112 may modify generic file-classification definition 140(1) by decreasing distance threshold 430 such that the distance from centroid 420 to data sample 120 is above distance threshold 430. For example, modification module 112 may decrease distance threshold 430 within data sample 120 such that generic file-classification definition 140(1) classifies data sample 120 as malware. In other words, this decrease to distance threshold 430 may cause generic file-classification 140(1) to classify data sample 120 as non-malware if generic file-classification 140(1) were to classify data sample 120 anew.

In some examples, modification module 112 may modify generic file-classification definition 140(1) by increasing distance threshold 430. For example, as described above, classification module 106 may classify data sample 450 as non-malware due at least in part to the distance from centroid 420 to data sample 450 being above distance threshold 430. In this example, determination module 110 may determine that this classification of data sample 450 as non-malware is incorrect based at least in part on the query.

In response to this determination, modification module 112 may modify generic file-classification definition 140(1) by increasing distance threshold 430 such that the distance from centroid 420 to data sample 450 is below distance threshold 430. For example, modification module 112 may increase distance threshold 430 beyond data sample 450 such that generic file-classification definition 140(1) classifies data sample 120 as malware. In other words, this increase to distance threshold 430 may cause generic file-classification 140(1) to classify data sample 450 as malware if generic file-classification 140(1) were to classify data sample 450 anew.

In some examples, modification module 112 may customize generic file-classification definition 140(1) to client device 202 based at least in part on the browsing behavior and/or patterns of the user of client device 202. For example, as described above, classification module 106 may classify data samples 120 and 450 encountered by client device 202 based at least in part on generic file-classification definition 140(1). In this example, determination module 110 may determine that the classifications of data samples 120 and 450 are incorrect. Additionally or alternatively, modification module 112 may customize generic file-classification definition 140(1) to client device 202 based at least in part on the incorrect classifications of data samples 120 and 450 encountered by client device 202.

As explained above in connection with exemplary method 300 in FIG. 3, a security software product may update generic file-classification definitions to account for newly identified clean and/or malicious files. For example, a security software vendor may generate a generic file-classification definition from a set of training data that includes known clean and/or malicious files. However, after generating the generic file-classification definition and releasing the same to a security software product installed on a client device, the security software vendor may identify new clean and/or malicious files. Since the set of training data did not include these newly identified files, the generic file-classification definition may fail to account for certain information derived from these newly identified files. As a result, the generic file-classification definition may cause the security software product to produce a false negative and/or false positive upon encountering one of these files on the end-user's computing device.

In an effort to address this deficiency, the security software product installed on the client device may query at least one verification server in an attempt to verify the correctness of a classification of a data sample by the generic file-classification definition. By querying the verification server, the security software product may determine that the classification of the data sample is incorrect. In response to this determination, the security software product may modify the generic file-classification definition to account for the incorrect classification of the data sample.

Moreover, by modifying the generic file-classification definition at the client device, the security software product may conserve time and/or resources by eliminating the need to fully retrain the generic file-classification definition. Additionally or alternatively, by modifying the generic file-classification definition at the client device, the security software product may customize the generic file-classification definition to the client device based at least in part on the browsing behavior and/or patterns of the user of the client device.

Figure 5:
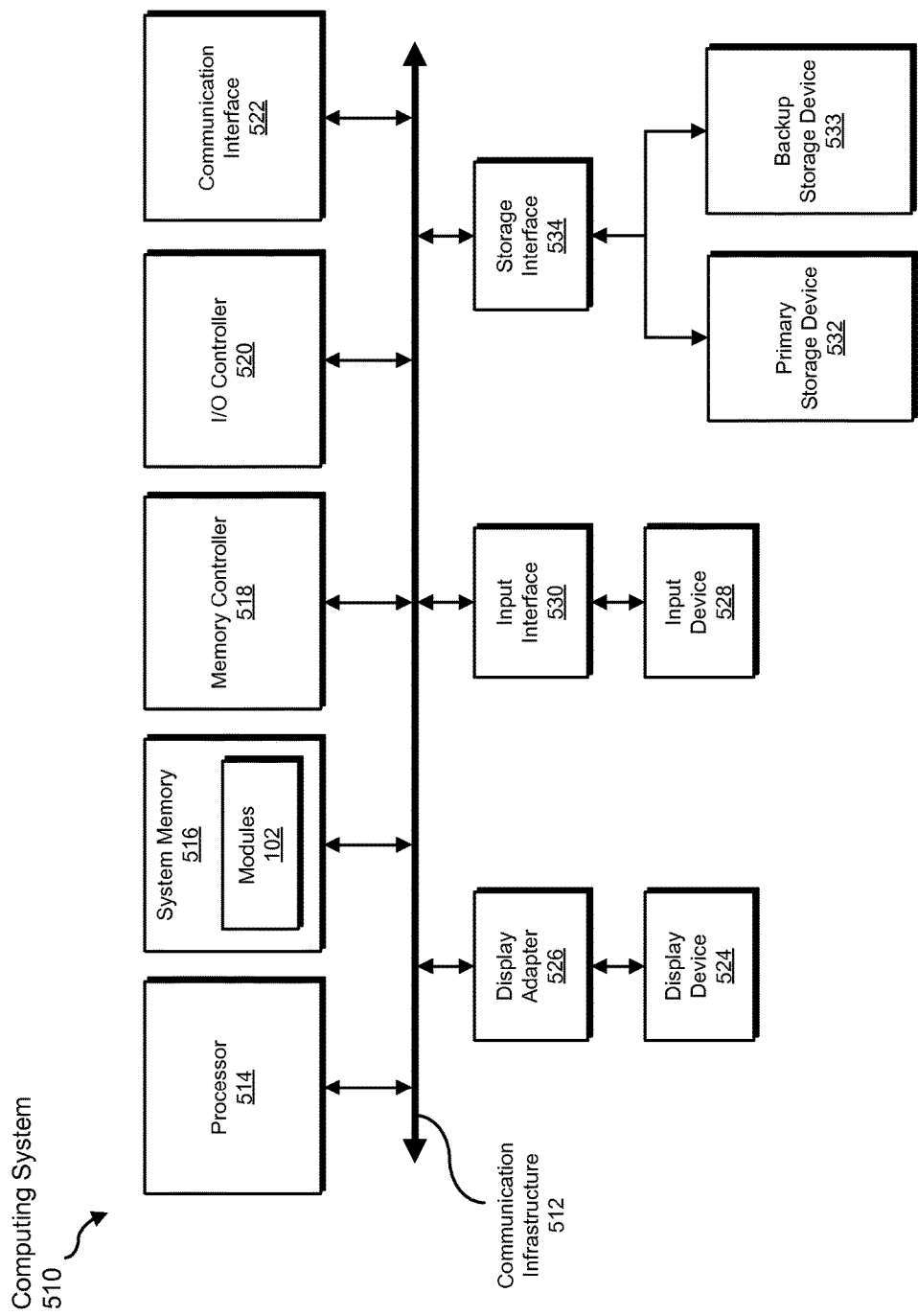
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
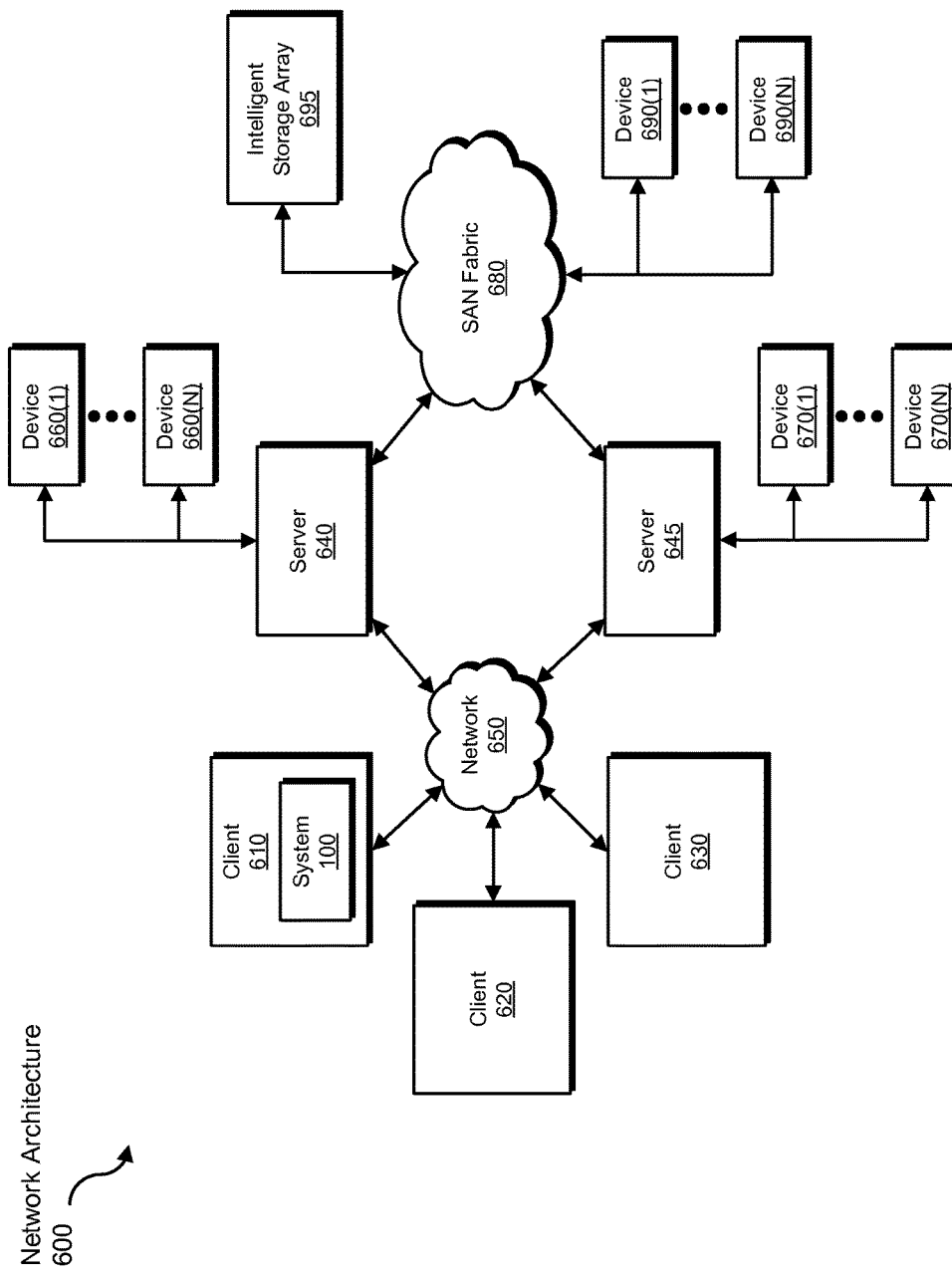
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for updating generic file-classification definitions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a generic file-classification definition to be transformed, transform the generic file-classification definition, output a result of the transformation to a computing device, use the result of the transformation to classify data samples, and store the result of the transformation for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for updating generic file-classification definitions, at least a portion of the method being performed by a computing device comprising at least one processor, the method comprising:
    identifying at least one generic file-classification definition deployed in a software product installed on a client device, the generic file-classification definition comprising a data cluster that:
        has been trained by a set of known malicious files and a set of known clean files; and
        has been fit to the set of known malicious files and the set of known clean files by applying a statistical algorithm;
    wherein the data cluster comprises:
        a plurality of training data samples;
        a centroid that:
            has been calculated by applying the statistical algorithm to the set of known malicious files and the set of known clean files; and
            represents an approximate center of the set of known malicious files and the set of known clean files;
        a distance threshold that varies throughout the data cluster; and
        a non-uniform virtual perimeter created by the distance threshold that varies throughout the data cluster;
    computing a distance from the centroid of the data cluster to a data sample encountered by the client device;
    determining that the distance from the centroid to the data sample is below the distance threshold;
    in response to determining that the distance from the centroid to the data sample is below the distance threshold, classifying the data sample as malware based at least in part on the distance from the centroid to the data sample;
    querying at least one verification server in an attempt to verify the correctness of the malware classification of the data sample by obtaining information about the data sample that was unavailable when the generic file-classification definition was released, the information indicating that the data sample is clean even though the generic file-classification definition classified the data sample as malware;
    determining, based at least in part on the information about the data sample that was unavailable when the generic file-classification definition was released, that the malware classification of the data sample is incorrect; and
    in response to determining that the malware classification of the data sample is incorrect, modifying the generic file-classification definition deployed in the software product based at least in part on the data sample to account for the incorrect classification of the data sample without retraining the generic file-classification definition, wherein modifying the generic file-classification definition comprises:
    customizing the generic file-classification definition to the client device based at least in part on browsing behavior or patterns of a user of the client device and due at least in part to the client device having encountered the data sample that was incorrectly classified; and
    decreasing the distance threshold such that:
        the distance from the centroid to the data sample is above the distance threshold; and
        the generic file-classification definition would classify the data sample as clean in the event that the generic file-classification definition were to classify the data sample anew.

2. The computer-implemented method of claim 1, wherein:
    computing the distance from the centroid to the data sample comprises applying, to the data sample, a distance function that generates a value representing the distance from the centroid to the data sample; and classifying the data sample comprises determining that the value representing the distance from the centroid to the data sample is below the distance threshold by comparing the value with the distance threshold.

3. The computer-implemented method of claim 1, wherein:

computing the distance from the centroid to the data sample comprises applying, to the data sample, a distance function that generates a value representing the distance from the centroid to the data sample; and classifying the data sample comprises determining that the value representing the distance from the centroid to the data sample is above the distance threshold by comparing the value with the distance threshold.

4. The computer-implemented method of claim 1, wherein:

classifying the data sample comprises determining that the distance from the centroid to the data sample is above the distance threshold; and modifying the generic file-classification definition comprises increasing the distance threshold such that the distance from the centroid to the data sample is below the distance threshold.

5. The computer-implemented method of claim 4, wherein:

the distance threshold represents a distance above which data samples are unlikely to include malware;

classifying the data sample comprises classifying the data sample as non-malware due at least in part to the distance from the centroid to the data sample being above the distance threshold; and increasing the distance threshold comprises increasing the distance threshold beyond the data sample such that the generic file-classification definition classifies the data sample as malware.

6. The computer-implemented method of claim 1, wherein:

the distance threshold represents a distance below which data samples are likely to include malware;

classifying the data sample comprises classifying the data sample as malware due at least in part to the distance from the centroid to the data sample being below the distance threshold; and decreasing the distance threshold comprises decreasing the distance threshold within the data sample such that the generic file-classification definition classifies the data sample as non-malware.

7. The computer-implemented method of claim 1, wherein:

the centroid comprises a reference data point calculated based at least in part on the plurality of training data samples; and the distance threshold comprises a reference distance determined based at least in part on the plurality of training data samples.

8. The computer-implemented method of claim 1, wherein:

classifying the data sample encountered by the client device comprises classifying, based at least in part on the generic file-classification definition, a plurality of data samples encountered by the client device; and modifying the generic file-classification definition comprises customizing, based at least in part on the plurality of data samples encountered by the client device, the generic file-classification definition to the client device.

9. A system for updating generic file-classification definitions comprising:

an identification module, stored in memory, that identifies at least one generic file-classification definition deployed in a software product installed on a client device, the generic file-classification definition comprising a data cluster that:

has been trained by a set of known malicious files and a set of known clean files; and has been fit to the set of known malicious files and the set of known clean files by applying a statistical algorithm;

wherein the data cluster comprises:

a plurality of training data samples;

a centroid that:

has been calculated by applying the statistical algorithm to the set of known malicious files and the set of known clean files; and represents an approximate center of the set of known malicious files and the set of known clean files;

a distance threshold that varies throughout the data cluster; and a non-uniform virtual perimeter created by the distance threshold that varies throughout the data cluster;

a classification module, stored in memory, that:

computes a distance from the centroid of the data cluster to a data sample encountered by the client device;

determines that the distance from the centroid to the data sample is below the distance threshold; and classify, in response to determining that the distance from the centroid to the data sample is below the distance threshold, the data sample as malware based at least in part on the distance from the centroid to the data sample;

a query module, stored in memory, that queries at least one verification server in an attempt to verify the correctness of the malware classification of the data sample by obtaining information about the data sample that was unavailable when the generic file-classification definition was released, the information indicating that the data sample is clean even though the generic file-classification definition classified the data sample as malware;

a determination module, stored in memory, that determines, based at least in part on the information about the data sample that was unavailable when the generic file-classification definition was released, that the malware classification of the data sample is incorrect;

a modification module, stored in memory, that modifies, in response to the determination that the malware classification of the data sample is incorrect, the generic file-classification definition deployed in the software product based at least in part on the data sample to account for the incorrect classification of the data sample without retraining the generic file-classification definition, wherein modifying the generic file-classification definition comprises:

customizing the generic file-classification definition to the client device based at least in part on browsing behavior or patterns of a user of the client device and due at least in part to the client device having encountered the data sample that was incorrectly classified; and decreasing the distance threshold such that:

the distance from the centroid to the data sample is above the distance threshold; and the generic file-classification definition would classify the data sample as clean in the event that the generic file-classification definition were to classify the data sample anew; and at least one physical processor configured to execute the identification module, the classification module, the query module, the determination module, and the modification module.

10. The system of claim 9, wherein the classification module:
applies, to the data sample, a distance function that generates a value representing the distance from the centroid to the data sample; and
determines that the value representing the distance from the centroid to the data sample is below the distance threshold by comparing the value with the distance threshold.

11. The system of claim 9, wherein the classification module:
applies, to the data sample, a distance function that generates a value representing the distance from the centroid to the data sample; and
determines that the value representing the distance from the centroid to the data sample is above the distance threshold by comparing the value representing the distance from the centroid to the data sample with the distance threshold.

12. The system of claim 9, wherein:
the classification module classifies the data sample by determining that the distance from the centroid to the data sample is above the distance threshold; and
the modification module modifies the generic file-classification definition by increasing the distance threshold such that the distance from the centroid to the data sample is below the distance threshold.

13. The system of claim 9, wherein:
the centroid comprises a data point calculated based at least in part on the plurality of training data samples; and
the distance threshold comprises a reference distance determined based at least in part on the plurality of training data samples.

14. A non-transitory computer-readable medium comprising one or more computer-executable instructions that, when executed by at least one processor of a computing device, cause the computing device to:
identify at least one generic file-classification definition deployed in a software product installed on the computing device, the generic file-classification definition comprising a data cluster that:
has been trained by a set of known malicious files and a set of known clean files; and
has been fit to the set of known malicious files and the set of known clean files by applying a statistical algorithm;
wherein the data cluster comprises:
a plurality of training data samples;
a centroid that:
has been calculated by applying the statistical algorithm to the set of known malicious files and the set of known clean files; and
represents an approximate center of the set of known malicious files and the set of known clean files;
a distance threshold that varies throughout the data cluster; and
a non-uniform virtual perimeter created by the distance threshold that varies throughout the data cluster;
compute a distance from the centroid of the data cluster to a data sample encountered by the computing device;
determine that the distance from the centroid to the data sample is below the distance threshold;
classify, in response to determining that the distance from the centroid to the data sample is below the distance threshold, the data sample as malware based at least in part on the distance from the centroid to the data sample;
query at least one verification server in an attempt to verify the correctness of the malware classification of the data sample by obtaining information about the data sample that was unavailable when the generic file-classification definition was released, the information indicating that the data sample is clean even though the generic file-classification definition classified the data sample as malware;
determine, based at least in part on the information about the data sample that was unavailable when the generic file-classification definition was released, that the malware classification of the data sample is incorrect; and
modify, in response to the determination that the malware classification of the data sample is incorrect, the generic file-classification definition deployed in the software product based at least in part on the data sample to account for the incorrect classification of the data sample without retraining the generic file-classification definition, wherein modifying the generic file-classification definition comprises:
customizing the generic file-classification definition to the computing device based at least in part on browsing behavior or patterns of a user of the computing device and due at least in part to the computing device having encountered the data sample that was incorrectly classified; and
decreasing the distance threshold such that:
the distance from the centroid to the data sample is above the distance threshold; and
the generic file-classification definition would classify the data sample as clean in the event that the generic file-classification definition were to classify the data sample anew.

* * * * *